United States Patent
Nagle

(10) Patent No.: US 11,153,357 B2
(45) Date of Patent: Oct. 19, 2021

(54) SYSTEM AND METHOD FOR ALLOWING SIMULTANEOUS TCP CONNECTIONS TO A POINT-TO-POINT TCP CONNECTED DEVICE

(71) Applicant: Harman Professional, Inc., Northridge, CA (US)

(72) Inventor: Daniel Allan Nagle, Harvest, AL (US)

(73) Assignee: Harman Professional, Inc., Northridge (CA)

( * ) Notice: Subject to any disclaimer, the term of this patent is extended or adjusted under 35 U.S.C. 154(b) by 41 days.

(21) Appl. No.: 16/163,749

(22) Filed: Oct. 18, 2018

(65) Prior Publication Data
US 2019/0124126 A1   Apr. 25, 2019

Related U.S. Application Data

(60) Provisional application No. 62/576,719, filed on Oct. 25, 2017.

(51) Int. Cl.
*H04L 29/06* (2006.01)
*H04L 12/18* (2006.01)

(52) U.S. Cl.
CPC ........ *H04L 65/403* (2013.01); *H04L 65/1069* (2013.01); *H04L 69/163* (2013.01); *H04L 12/1822* (2013.01)

(58) Field of Classification Search
CPC .. H04L 65/403; H04L 65/1069; H04L 69/163
See application file for complete search history.

(56) References Cited

U.S. PATENT DOCUMENTS

| | | | |
|---|---|---|---|
| 7,975,051 B2 | 7/2011 | Saint Clair et al. | |
| 8,732,753 B2 | 5/2014 | Warrick | |
| 2002/0128898 A1* | 9/2002 | Smith, Jr. | G06Q 10/06 705/7.32 |
| 2008/0114882 A1 | 5/2008 | Christenson | |
| 2008/0247348 A1* | 10/2008 | Wilson | H04L 67/1027 370/313 |
| 2011/0119075 A1* | 5/2011 | Dhoble | G16H 10/60 705/2 |
| 2016/0134427 A1* | 5/2016 | Huang | H04L 12/2816 713/300 |
| 2016/0309345 A1* | 10/2016 | Tehrani | H04W 72/0426 |
| 2017/0359756 A1* | 12/2017 | Vangala | H04W 24/02 |
| 2020/0036777 A1* | 1/2020 | Vernia | H04L 67/1019 |

* cited by examiner

*Primary Examiner* — Walter J Divito
*Assistant Examiner* — Anthony Luo
(74) *Attorney, Agent, or Firm* — Angela M. Brunetti

(57) ABSTRACT

A central server communicates requests from the at least one third-party device, in a plurality of third-party devices having a TCP connection with the central server, to a target device using the TCP connection established between the central server and a point-to-point receiver. The central server receives data from the target device using the TCP connection established between the central server and the point-to-point receiver. The central server delivers data to all of the plurality of third-party devices using the TCP connections established between the central server and each of the plurality of third-party devices.

9 Claims, 2 Drawing Sheets

SYSTEM AND METHOD FOR ALLOWING SIMULTANEOUS TCP CONNECTIONS TO A POINT-TO-POINT TCP CONNECTED DEVICE

CROSS REFERENCE TO RELATED APPLICATION

This application claims the benefit of U.S. Provisional Application Ser. No. 62/576,719, filed Oct. 25, 2017, the disclosure of which is incorporated in its entirety by reference.

TECHNICAL FIELD

The inventive subject matter is directed to a system and method for implementing web-based simultaneous TCP connections of multiple third-party devices to a device that supports only one TCP connection at a time.

BACKGROUND

A system having multiple devices networked, via TCP, to a TCP server having, for example, an RS-232 connection to a target device may result in slow performance caused by network traffic and congestion from multiple devices repeatedly polling the TCP server for information from the target device. For example, multiple third-party devices that need to know a status of the target device in order to carry out tasks or functions are limited by the TCP point-to-point receiver. The arrangement creates a bottleneck because it is fundamentally a point-to-point communications protocol. While multiple third-party devices may communicate with the target device over separate TCP connections, the communication is to a TCP point-to-point receiver that relays commands to the target device by way of an RS-232 connection. Each device must take turns communicating with the target device because of the TCP point-to-point receiver. As an example, third-party devices such as touch screen control panels in multiple conference rooms throughout an office area may need to know the status of a particular projector in the office area. Each of the touch screen control panels is vying for a connection to the projector in order to control a specific function of the projector and the touch screen control panels need to know whether the projector is powered on. However, the TCP point-to-point receiver limits connection to the projector.

Typically a retry method is implemented in which each third-party device that needs information from the target device repeats attempted requests through the server until it connects with the singular device and receives the requested data. The retry method is slow and generates a lot of extra network traffic and congestion. This method requires establishing a TCP connection, sending data, and then tearing down the TCP connection, which is time consuming and has to be done repeatedly in a short amount of time to ensure that the most recent data is not missed.

There is a need for a system and method that facilitates simultaneous TCP connections of multiple third-party devices to a target device that typically only supports one TCP connection at a time. The system and method must make and keep a connection so that as data becomes available it may be transmitted as soon as it occurs without creating extraneous network traffic or spending time polling.

SUMMARY

A system having a target device, a point-to-point receiver having a connection to the target device, a central server capable of establishing multiple TCP connections including a TCP connection with the point-to-point receiver, a plurality of third-party devices, each third-party device in the plurality of third-party devices also being capable of establishing a TCP connection with the central server; and the central server establishing and maintaining the TCP connection with the point-to-point receiver at the request and establishment of a TCP connection and a request for communication with the target device from at least one third-party device in the plurality of third-party devices. The central server communicates requests from the at least one third-party device to the target device using the TCP connection established between the central server and the point-to-point receiver. The central server receives data from the target device using the TCP connection established between the central server and the point-to-point receiver. The central server delivers data to the plurality of third-party devices using the TCP connections established between the central server and each of the plurality of third-party devices.

Elements and steps in the figures are illustrated for simplicity and clarity and have not necessarily been rendered according to any particular sequence. For example, steps that may be performed concurrently or in different order are illustrated in the figures to help to improve understanding of embodiments of the inventive subject matter.

DETAILED DESCRIPTION

While various aspects of the inventive subject matter are described with reference to a particular illustrative embodiment, the inventive subject matter is not limited to such embodiments, and additional modifications, applications, and embodiments may be implemented without departing from the inventive subject matter. In the figures, like reference numbers will be used to illustrate the same components. Those skilled in the art will recognize that the various components set forth herein may be altered without varying from the scope of the inventive subject matter.

Any one or more of the servers, receivers, or devices described herein include computer executable instructions that may be compiled or interpreted from computer programs created using a variety of programming languages and/or technologies. In general, a processor (such as a microprocessor) receives instructions, for example from a memory, a computer-readable medium, or the like, and executes the instructions. A processing unit includes a non-transitory computer-readable storage medium capable of executing instructions of a software program. The computer readable storage medium may be, but is not limited to, an electronic storage device, a magnetic storage device, an optical storage device, an electromagnetic storage device, a semi-conductor storage device, or any suitable combination thereof. Any one or more the devices herein may rely on firmware, which may require updates from time to time to ensure compatibility with operating systems, improvements and additional functionality, security updates or the like.

Connecting and networking servers, receivers or devices may include, but are not limited to, SATA, Wi-Fi, lightning, Ethernet, UFS, 5G, etc. One or more servers, receivers, or devices may operate using a dedicated operating system, multiple software programs and/or platforms for interfaces such as graphics, audio, wireless networking, enabling applications, integrating hardware of vehicle components, systems, and external devices such as smart phones, tablets, and other systems to name just a few.

Figure 1:
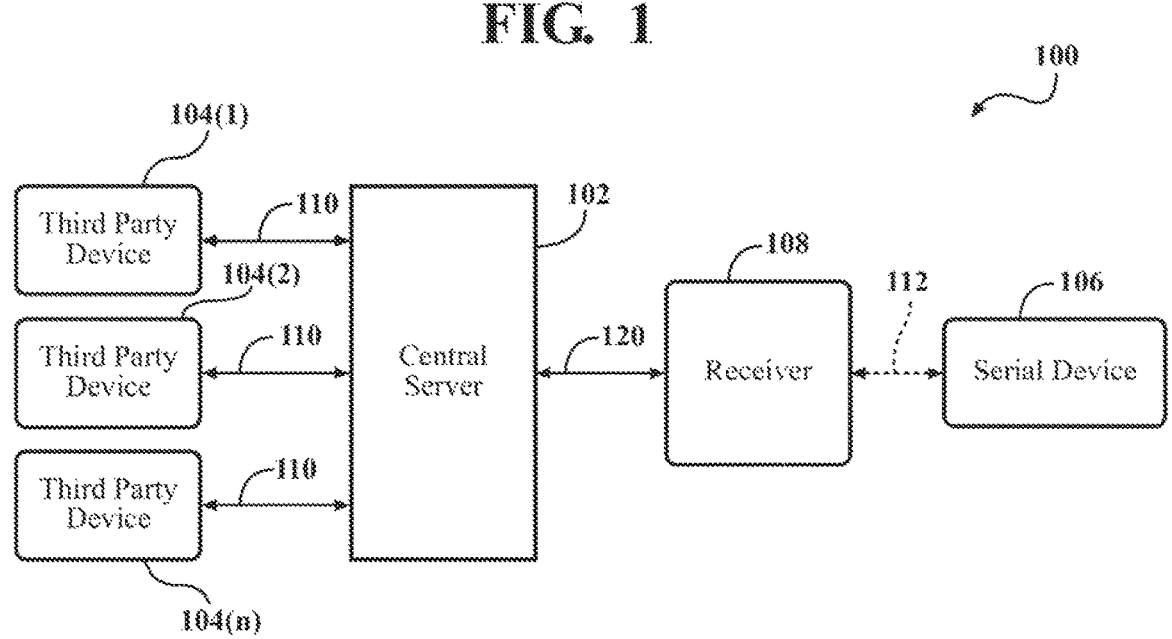
FIG. 1 is a block diagram of a system facilitating communication between multiple third-party devices and a target device.

FIG. 1 is a block diagram of a system 100 having a central server 102 that facilitates communication between a plurality of third-party devices 104(1-*n*) and a target device 106. The third-party devices 104(1)-104(*n*) are each connected, by way of their own Transmission Control Protocol (TCP) 110, to the central server 102. The central server 102 is connected, by way of its own TCP connection 120, to a point-to-point receiver 108. The point-to-point receiver 108 is connected, in this example by way of RS-232 serial connection 112, to the target device 106. The central server 102 is capable of managing the multiple TCP connections with the third-party devices 104(1)-104(*n*). The central server 102 relays data and commands from the multiple third-party devices 104(1-*n*) to the point-to-point receiver 108 using its own TCP connection 120 with the point-to-point receiver 108. The central server 102 also returns responses from the target device 106 and the point-to-point receiver 108 to each of the plurality of third-party devices 104(1-*n*) through the individual TCP connections 110. The central server 102 allows multiple third-party devices 104 to communicate with the point-to-point receiver 108 and the target device 106 even though the point-to-point receiver 108 and target device 106 themselves do not support multiple TCP connections.

Figure 2:
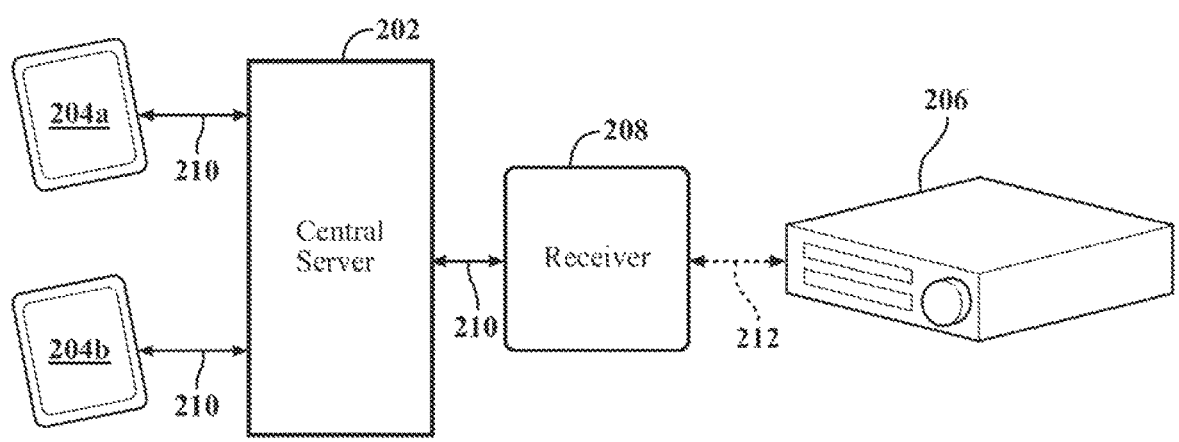
FIG. 2 is an example application of the system.

FIG. 2 is an example application 200 in an office area. A central server 202 is connected 220 to a receiver 208. The point-to-point receiver 208 is connected 212 to a target device such as a projector 206 that may be located in a conference room in the office area. The connection 220 between the central server 202 and the point-to-point receiver 208 may be a web-based TCP connection. The connection 212 between the point-to-point receiver 208 and the projector 206 may be an RS-232 serial connection.

Third-party devices 204*a* and 204*b* are shown as touch screen control panels. Touch screen control panel 204*a* may be located in the same room as the projector 206. Touch screen control panel 204*b* may be a master administrative control panel located in a central administrative location, remote from the conference room where the projector 206 is located but whose purpose is to monitor target devices throughout the office area. It should be noted that the third-party devices 204*a* and 204*b* and target device 206 are described herein for example purposes only and one skilled in the art understands that many other devices, combinations of devices, etc. may be considered third-party devices and target devices and are too numerous to mention herein.

Each touch screen control panel 204*a* and 204*b* may request data from the projector that indicates a status as to whether the projector 206 is on or off. In prior art situations, when more than one third-party device simultaneously needs to know if a target device is on or off, the RS-232 connection would cause a bottleneck because more than one third-party device is requesting data from the target device and the serial connection only allows one device to talk at a time. The central server 202 alleviates this bottleneck problem. Each of the touch screen control panels 204*a* and 204*b* will make the request for information through their own connection 210 with the central server 202. A separate TCP connection 220 between the central server 202 and the point-to-point receiver 208 allows the central server 202 to immediately request the data from the target device 206 and once the result is outputted, the central server 202 will immediately notify each of the touch screen control panels 204*a*, 204*b*. Because the central server 202 alone is communicating with the target device 206 through the point-to-point receiver 208, network traffic is minimized and network congestion is avoided.

As long as at least one touch screen control panel 204*a* or 204*b* is requesting communication with the target device 206, the connection 220 established by the central server 202 with the target device 206 through the point-to-point receiver 208 will be maintained. As soon as the remaining touch screen control panel 204*a* or 204*b* indicates its wishes to unsubscribe, only then will the central server 202 close its connection 220 with the point-to-point receiver 208.

Should the connection 220 between the central server 202 and the point-to-point receiver 208 unexpectedly drop while at least one of the TCP connections 210 actively exist between the third-party devices and the central server, the central server will automatically re-establish the connection 220 to the point-to-point receiver 208 because it has active subscribers. In the event a TCP connection times out, the central server 208 will consider the time out as a request to unsubscribe.

Figure 3:
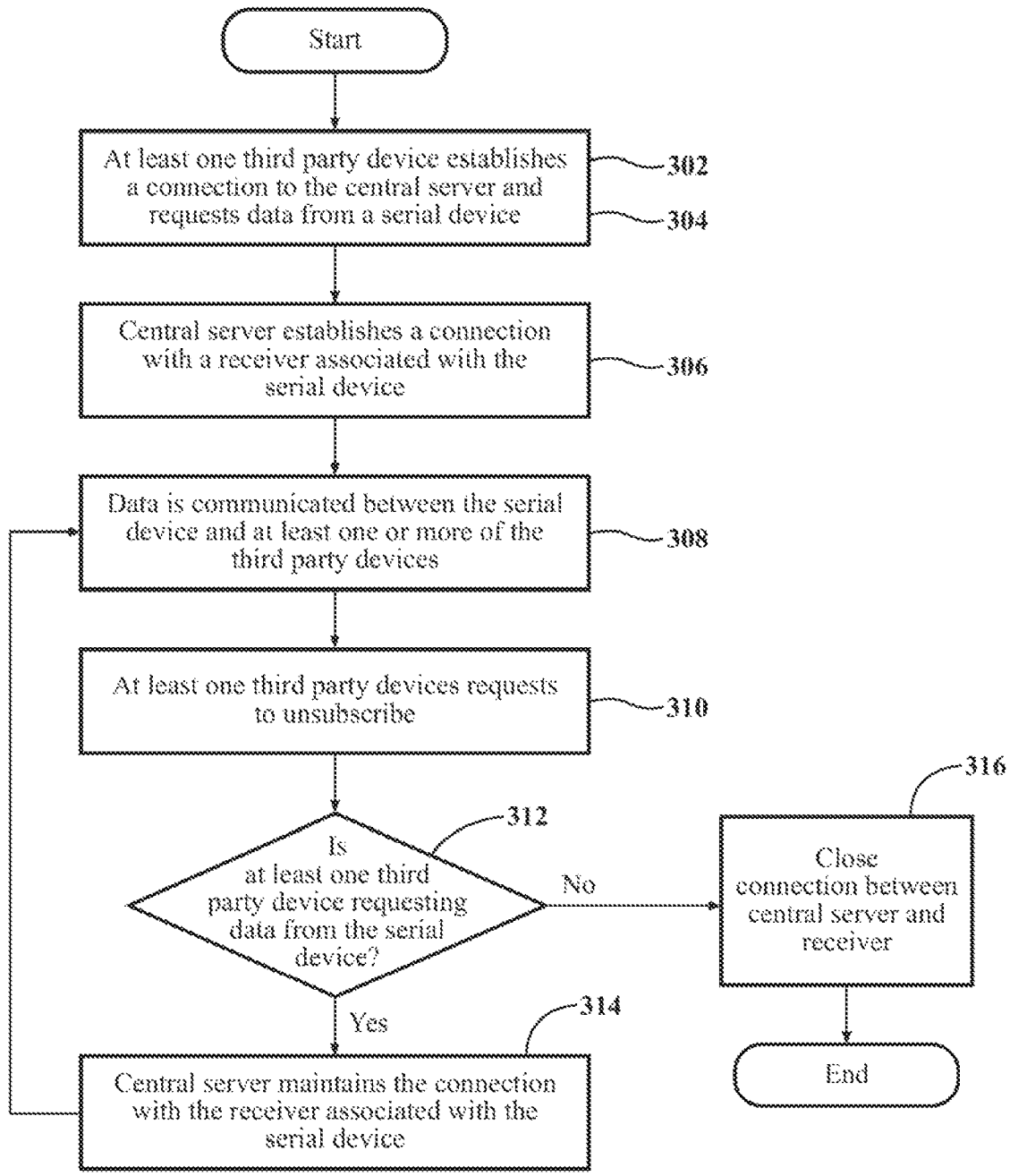
FIG. 3 is a flow diagram of a method for facilitating communication between multiple third-party devices and a target device.

FIG. 3 is flow diagram 300 of a method for implementing simultaneous TCP connections of multiple third-party devices to a target device that supports only one TCP connection at a time. At least one third-party device makes a persistent connection 302 to the central server and requests 304 status data from the target device. The central server makes and keeps a connection 306 with a point-to-point receiver associated with the target device.

Another third-party device also persistently connects 302 to the central server and also requests 304 status data from the target device. The central server has already established the connection 306 with the point-to-point receiver so the connection is reused to fulfill the status request from any other third-party devices that are connected to the central server. The central server receives the data 308 from the point-to-point receiver associated with the target device and echoes the data back to the third-party devices.

When any one or more of the third-party devices wishes to unsubscribe 310, the method determines 312 if any one of the plurality of third-party devices is still requesting a connection to the target device. The central server will maintain the connection 314 to the point-to-point receiver until a point in time that there are no longer any third-party devices that indicate the need for a connection. At that time, when there are no devices actively communicating with the target device through the central server, the central server will close 316 its connection with the point-to-point receiver.

An application of the method is presented herein with a central server, a point-to-point receiver having an example IP address and two third-party devices looking to communicate with a target device. The target device has an RS-232 connection with the point-to-point receiver. A first third-party device makes a persistent (TCP) connection to the central server and indicates that it would like to send data. The central server connects to the point-to-point receiver, which has an IP address 192.1681.2 and maintains the connection. The central server sends the data indicated by the first third-party device by way of the point-to-point receiver to the target device. In the event there is a response to the sent data, the central server will echo the response to the first third-party device. A second third-party device also makes a persistent connection to the central server and indicates that it would like to send data. The central server sends the data and will echo back any response to both the first and the second third-party devices. If the target device sends unsolicited data, the central server will send the unsolicited data to the first and second third-party devices. In the event the connection between the point-to-point receiver and the central server unexpectedly drops, the central server will automatically re-establish the connection because it has subscribers, i.e., the first and second third-party devices. When the first third-party device unsubscribes from the central server, the central server will still maintain the TCP connection, 192.168.1.2, to the point-to-point receiver because the second third-party device is still subscribed. Only when the second third-party device tells the central server it wishes to unsubscribe will the central sever close its connection, 192.168.1.2, to the point-to-point receiver because there are no longer any subscribers to the central server.

In the foregoing specification, the inventive subject matter has been described with reference to specific exemplary embodiments. Various modifications and changes may be made, however, without departing from the scope of the inventive subject matter as set forth in the claims. The specification and figures are illustrative, rather than restrictive, and modifications are intended to be included within the scope of the inventive subject matter. Accordingly, the scope of the inventive subject matter should be determined by the claims and their legal equivalents rather than by merely the examples described.

For example, the steps recited in any method or process claims may be executed in any order and are not limited to the specific order presented in the claims. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

The terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the inventive subject matter, in addition to those not specifically recited, may be varied or otherwise particularly adapted to specific environments, manufacturing specifications, design parameters or other operating requirements without departing from the general principles of the same.

The invention claimed is:

1. A system comprising:
    a target device;
    a point-to-point receiver having a connection to the target device and a capability for at least one transmission control protocol (TCP) connection;
    a central server capable of handling a plurality of TCP connections, at least one being a TCP connection with the point-to-point receiver;
    a plurality of third-party devices, each capable of establishing a TCP connection with the central server;
    the central server establishing and maintaining the TCP connection with the point-to-point receiver upon a request and establishment of a TCP connection with at least one third-party device in the plurality of third-party devices, the central server immediately communicates requests for data from at least one third-party device to the target device using the TCP connection established between the central server and the point-to-point receiver; and
    upon receiving the requested data from the target device, the central server communicates the data requested by the at least one third-party device simultaneously to all of the third-party devices that have a TCP connection to the central server regardless of which third-party device made the request.

2. The system as claimed in claim 1 wherein the central server maintains the TCP connection with the point-to-point receiver as long as at least one of the plurality of third-party devices is requesting data about the target device.

3. The system as claimed in claim 2 wherein when the TCP connection between the central server and the point-to-point receiver is dropped, the central server re-establishes a TCP connection with the point-to-point receiver as long as at least one of the third-party devices has an established TCP connection with the central server.

4. The system as claimed in claim 1 further comprising unsolicited data sent from the point-to-point receiver to the central server and wherein the unsolicited data is simultaneously communicated to all of the third-party devices having a TCP connection to the central server.

5. A method for managing data communicated between a target device and a plurality of third-party devices, the method comprising the steps of:
    establishing a connection between the target device and a point-to-point receiver;
    establishing a transmission control protocol (TCP) connection between the point-to-point receiver and a central server;
    establishing a TCP connection between each third-party device actively seeking data from the target device and the central server;
    at least one third-party device in the plurality of third-party devices requesting data from the target device by way of the connection between the central server and the point-to-point receiver;
    the central server receiving the data requested by the at least one third-party device from the target device by way of the connection between the central server and the point-to-point receiver; and
    the central server communicating the data requested by the at least one third-party device simultaneously to all of the third-party devices in the plurality of third-party devices that have a TCP connection with the central server regardless of which third-party device made the request.

6. The method as claimed in claim 5 wherein the target device is a serial device and the step of establishing a connection between the target device and the point-to-point receiver is established by way of RS-232 connection.

7. The method as claimed in claim 5 wherein the step of establishing a TCP connection between the point-to-point receiver and a central server further comprises the step of maintaining the TCP connection between the point-to-point receiver and the central server as long as at least one of the third-party devices is actively connected to the central server.

8. A system for facilitating communication between a plurality of third-party devices and a target device having only a serial port for communication, the system comprising:

a point-to-point receiver having a serial connection to the target device;

a central server maintaining a single transmission control (TCP) connection between the central server and the point-to-point receiver and at least one TCP connection to at least one of the plurality of third-party devices to communicate requests for data about the target device;

requests for data about the target device being made by at least one of the plurality of third-party devices are received at the central server;

the central server communicates the requests for data to the target device by way of the single TCP connection with the point-to-point receiver;

requested data from the target device is received at the central server by way of the single TCP connection with the point-to-point receiver; and the central server simultaneously delivers the requested data to all of the third-party devices having a TCP connection to the central server regardless of which third-party device made the request.

9. The system as claimed in claim 8 wherein the single TCP connection between the central server and the point-to-point receiver is maintained as long as there is at least one third-party device in the plurality of third-party devices with a TCP connection to the server.

* * * * *